May 31, 1960 H. BRETTHAUER ET AL 2,938,440
PHOTOGRAPHIC SHUTTER AND DIAPHRAGM ADJUSTING MECHANISM
Filed Feb. 19, 1959 4 Sheets-Sheet 4

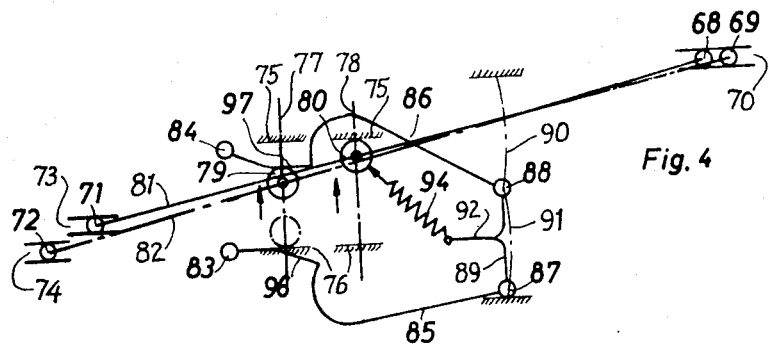
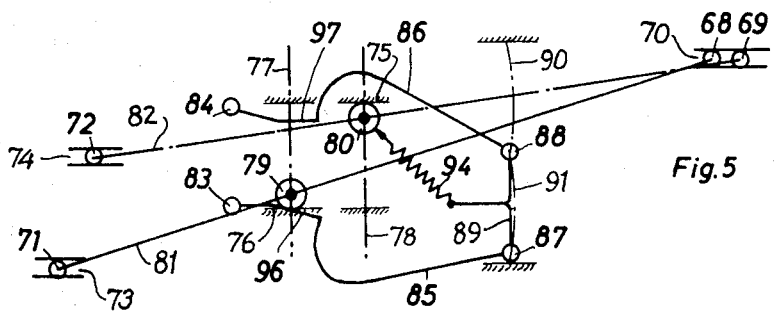
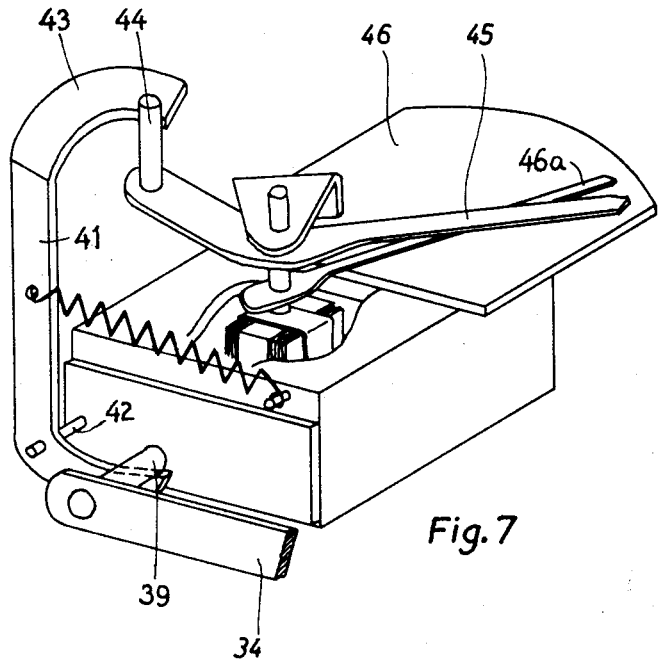

United States Patent Office 2,938,440
Patented May 31, 1960

2,938,440

PHOTOGRAPHIC SHUTTER AND DIAPHRAGM ADJUSTING MECHANISM

Hermann Bretthauer, Kl. Stockheim, near Braunschweig, and Karl Rander, Braunschweig, Germany, assignors to Franke & Heidecke Fabrik Photographischer Prazisions-Apparate, Braunschweig, Germany, a firm of Germany Filed Feb. 19, 1959, Ser. No. 794,403

Claims priority, application Germany Mar. 6, 1958

6 Claims. (Cl. 95—10)

The present invention relates to a photographic camera equipped with a built-in exposure value meter having at least two measuring ranges and to a shutter and diaphragm adjusting mechanism for semi-automatically setting exposure values in accordance with the indications of the exposure meter and, more particularly, to such a camera wherein the change-over from one measuring range to the other is accomplished automatically. The camera is preferably of the type having mirror reflex focusing and view finding chambers such as, but not limited to, the twin lens reflex camera currently available on the market under the trademark "Rolleiflex."

An object of the invention is to provide a new and improved shutter and diaphragm adjusting mechanism for the setting of exposure values in accordance with the indications of an exposure value meter having two measuring ranges, wherein the change-over from one range to the other is effected automatically.

Another object is the provision of a generally improved and more satisfactory exposure value setting mechanism including a lever differential coupled with a follow-up pointer to be alined with the poiner of a built-in exposure value meter and having a wide range of adjustability.

Yet another object of the invention is to provide a camera equipped with a built-in photoelectric cell having two sensitivity ranges and an exposure value meter having two corresponding measuring ranges, and to provide an exposure value setting mechanism for the camera which operates in both of the ranges and shifts ranges automatically.

A further object is the provision of a new and improved shutter and diaphragm adjusting mechanism for the setting of exposure values including a lever differential coupled with a follow-up pointer arranged to be alined with an exposure value meter pointer and also coupled to a device for changing sensitivity ranges on a photoelectric cell, the change of ranges being effected automatically.

These and other desirable objects may be attained in the manner disclosed as an illustrative embodiment of the invention in the following description and in the accompanying drawings forming a part hereof, in which:

Fig. 4 is a schematic diagram of the system just after changing over the measurement range;

Fig. 5 is a schematic diagram showing the starting position for the other measurement range;

Figure 1:
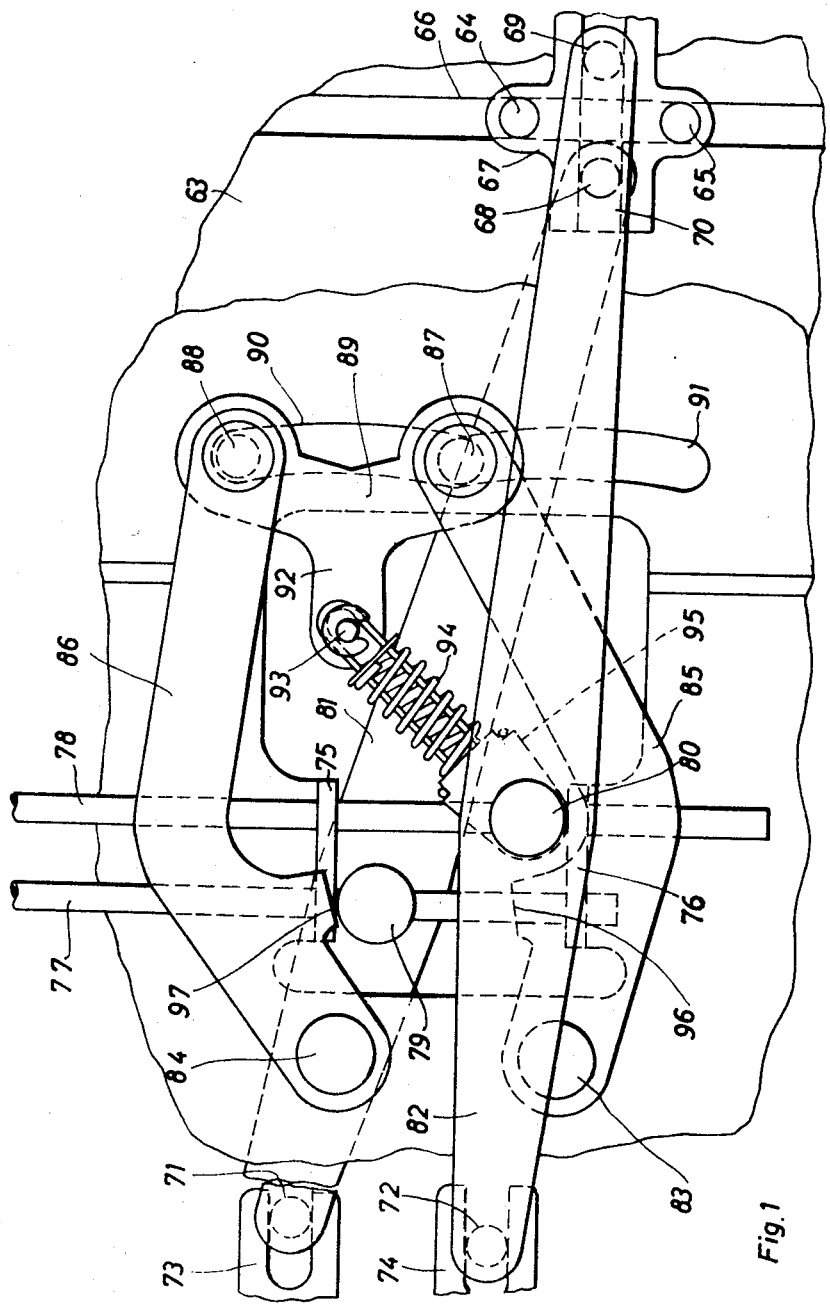
Fig. 1 is a side elevational view of the lever differential adjusting mechanism according to the present invention, including portions of the connections, shown broken away, of the drive for the differential, the follow-up pointer, and the change-over linkage for the photoelectric cell.
Figure 6:
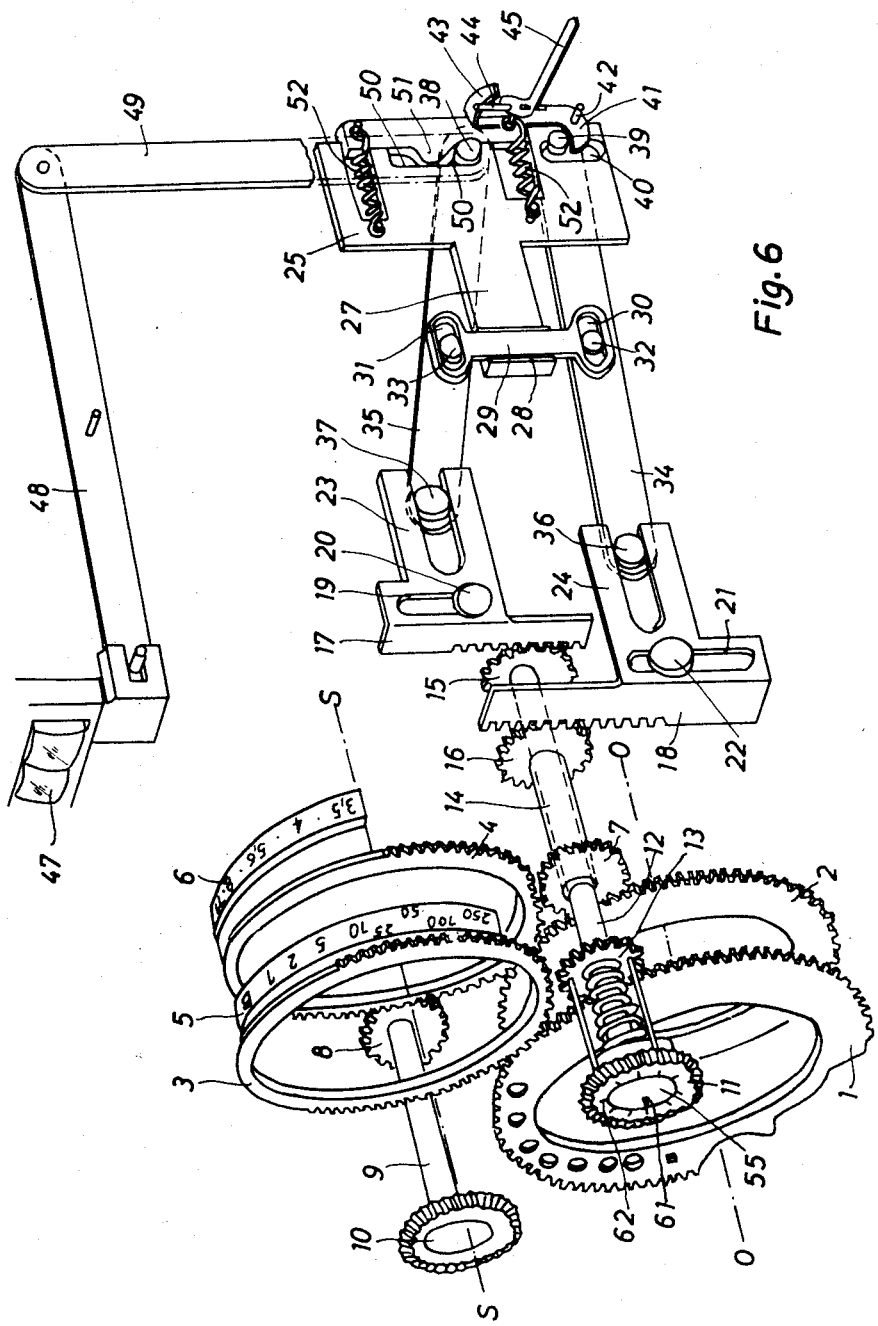

Fig. 6 is a reproduction of Fig. 1 of the copending patent application of Hermann Bretthauer, Serial No. 791,355, filed February 5, 1959, showing a skeletonized or diagrammatic perspective view of an adjusting mechanism, with conventional parts of the camera construction omitted for the sake of clarity; and Fig. 7 is a reproduction of Fig. 4 of the same copending application including an enlarged view of a portion of the mechanism shown in Fig. 6 and further including a perspective view of an exposure value meter.

The same reference numerals throughout the several views indicate the same parts.

As already indicated, the present invention is intended especially for use with a photographic camera having a mirror reflex focusing and view finding chamber, the problems in connection with adjustment of shutter speed and diaphragm aperture in such cameras being somewhat different than with other types of cameras. While the present invention may be applied to various forms of twin lens reflex cameras, it is here disclosed by way of example as applied to a twin lens reflex camera of the kind identified by the trademark "Rolleiflex" manufactured by the firm of Franke & Heidecke, of Braunschweig, Germany, and widely known and used throughout the United States. The following disclosure of the invention presupposes familiarity with the main constructional features of the "Rolleiflex" camera. For those not already familiar with the construction of this camera, reference may be made to the book "Rollei Photography, Handbook of the Rolleiflex and Rolleicord Cameras," by Jacob Deschin, published in 1952, by Camera Craft Publishing Company, of San Francisco, California. As will be readily understood by those familiar with the "Rolleiflex" camera, this camera comprises two lenses, a lower or picture-taking lens with which a shutter is associated, and an upper or finder lens with no shutter. The shutter may be of any convenient form, such as the shutter marketed under the trademark "Compur" manufactured for many years by the firm of Friedrich Deckel, of Munich, Germany.

The shutter speed and diaphragm aperture adjusting mechanism according to the invention uses a lever differential which is operatively coupled with a follow-up pointer to be alined with the pointer of an exposure value meter, the meter having two measuring ranges. The present construction is an improvement over the construction disclosed in the copending patent application of Hermann Bretthauer, Serial No. 791,355, filed February 5, 1959, and Fig. 1 of that application has been reproduced here as Fig. 6 in order to supplement the disclosure of the present case and to facilitate its understanding. With reference to Fig. 6, wherein the conventional parts of the camera construction have been omitted for the sake of clarity, the optical axis of the picture-taking lens of its associated shutter is indicated by the broken line O—O, while the optical axis of the finder lens, located above and parallel to the optical axis of the picture-taking lens, is indicated by the broken line S—S. The lenses themselves, as well as the shutter and the camera body, are omitted from Fig. 6, it being understood that the two lenses and the shutter are carried by the camera front wall which is movable forwardly and backwardly (longitudinally of the two optical axes S—S and O—O) for purposes of focusing, by manipulation of the usual focusing knob on the camera body. Mounted on the camera front structure, not here shown, and extending outwardly therefrom in position accessible for operation by the fingers of the operator, are two adjusting knobs 10 and 11, shaped similarly to and occupying the same positions as the customary adjusting knobs already familiar in "Rolleiflex" cameras.

An auxiliary shutter speed adjusting ring 1 and an auxiliary diaphragm aperture adjusting ring 2 both rotate on the shutter casing about the optical axis O—O as an axis of rotation, and the ring 1 is coupled in the usual manner to the built-in speed setting or time setting ring of the shutter while the diaphragm ring 2 is likewise coupled in the usual manner to the aperture adjusting member of the shutter. The speed adjusting member 1 is provided with peripheral gear teeth which engage with peripheral gear teeth on a drum or ring 3 which rotates about the upper lens axis S—S as a center, and which has a flange provided with a graduated scale 5 marked with the various shutter speeds. The diaphragm adjusting ring 2 is also provided with peripheral gear teeth which mesh with peripheral gear teeth on a drum or ring 4. The ring 4, like the ring 3, rotates about the upper optical axis S—S as a center. This ring 4 has a flange provided with graduations or markings 6 showing the value of the aperture or stop for which the shutter diaphragm is set at any particular time, the scale 6 usually being graduated in terms of f number. The shutter speed graduations 5 and the diaphragm scale graduations 6 are both visible, when looking downwardly from above, through a sight window, not here shown.

The finger knob 10 is fixed to the front end of a shaft 9 which is journaled in suitable stationary bearings supported on the camera front, and which carries an intermediate pinion 8 fixed to its rear end and in meshing engagement with the peripheral teeth on the ring 4. By turning the knob 10, by finger pressure, the ring 4 may be turned through the pinion 8 to vary the stop or diaphragm aperture through its engagement with the adjusting ring 2. The other finger knob 11 is adjustably coupled to the front end of a shaft 12 by a clutch device, and a pinion 13 is also fixed to an intermediate portion of the shaft 12 and is in meshing engagement with the peripheral teeth on the shutter speed adjusting ring 1. Rotation of the knob 11 by finger pressure causes the pinion 13 to turn the ring 1 to vary the shutter speed while at the same time rotating the ring 3 until the desired shutter speed setting is obtained.

The camera is provided with a built-in exposure value meter, that is to say, the type which is permanently associated with the camera, or the type which is provided as a removable optional accessory. Preferably the exposure value meter is of the galvanometric type indicated at 46 in Fig. 7 and having a moving coil to which is connected a pointer 46a. The meter 46 is actuated in accordance with the output of a photoelectric cell 47 illustrated in Fig. 6, and is preferably mounted on the upper front portion of the stationary camera body.

The shutter speed setting ring 1 and the diaphragm aperture adjusting ring 2 and the respective adjusting knobs 11 and 10 associated therewith are operatively connected to a lever differential mechanism which is in turn coupled with a follow-up pointer 45, shown in Fig. 6, for the setting of exposure values on the camera by alining the follow-up pointer 45 with the pointer 46a of the exposure value meter 46. The lever differential mechanism is such that the camera may be set to a particular exposure value regardless of the absolute values of the shutter speed or diaphragm aperture, or that a particular shutter speed may be selected and the diaphragm aperture automatically adjusted to give the proper exposure value, or that the diaphragm aperture may be selected and the shutter speed automatically set in accordance with the proper exposure value. The photoelectric cell 47 and the meter 46 have two ranges, and the differential mechanism is adapted to operate in either of the ranges.

The shaft 12 is extended rearwardly to project into the stationary camera body and is provided at its end with a gear 15, the gear 15 being fixed to the shaft 12 and having the same rotational movement as the gear 13. Meshing with the gear 15 is a vertically extending rack 17 mounted on the stationary camera body for vertical up and down movement by the engagement of a pin 20 carried by the camera body in a slot 19. A rearwardly extending flange on the rack 17 is developed as a fork 23 extending parallel to the optical axis of the camera, and a pin 37 fixed to one arm of a lever 35 is slidably and pivotally mounted in the slot provided by the arms of the fork 23.

The diaphragm adjusting ring 2 is interconnected with a rack 18 similar to the rack 17. To this end, an intermediate gear 7 is in mesh with the peripheral gear teeth on the ring 2 and is fixed to one end of a hollow shaft 14, at the other end of which is secured a gear 16 in mesh with the vertical extending rack teeth on the rack 18. Conveniently the hollow shaft 14 is concentric with the shaft 12, that is, the shaft 12 extends through the shaft 14. Those parts of the shafts 12 and 14 disposed between the gears 7 and 16 are constructed in any suitable manner as telescopic shafts so that they transmit the rotation but permit alteration in their length. This is necessary as the gears 7 and 13 are mounted on the objective support, which is movable along the optical axis for focusing purposes, whereas the gears 15 and 16 are mounted on the main camera body housing and mesh with the racks 17 and 18.

The rack 18, like the rack 17, is mounted for limited movement perpendicular to the optical axis of the camera, by engagement of a stud 22 in the slot 21, and the rearwardly extending flange of the rack 18 is developed as a fork 24 similar to the fork 23. A pin 36 fixed to the forward end of a lever 34 is slidably and pivotally mounted in the slot provided by the fork 24. Thus it is seen that rotational adjustment of the rings 1 and 2 is transmitted to the racks 17 and 18 through the shafts 12 and 14 and the gears secured thereto and appears as vertical movement for correspondingly positioning the ends of the levers 34 and 35.

The levers 34 and 35 are pivotally interconnected intermediate their ends and extend rearwardly in the nature of converging sides of a parallelogram. To mount the rear ends of the levers 34 and 35, a plate 25 is provided secured to the camera housing and has a forwardly projecting arm having at its end a vertically extending guideway 28. A coupling member 29 is slidably engaged in the guideway 28 for vertical up and down movement and has at either end a pair of oval eyes 30 and 31. A stud 32 fixed to the lever 34 is pivotally and slidably engaged in the slot of the eye 30, whereas a stud 33 secured to the lever 35 is pivotally and slidably mounted in the slot of the eye 31. The rear end of the upper lever 35 is rotatably mounted in one of two upper and lower openings 50 provided between the rear edge of the plate 25 and the forward edge of a spring mounted wedge piece 51 having a central projection. The wedge piece 51 may be retracted rearwardly against the force of springs 52 in order to move the pin 38 carried by the end of the lever 35 from one opening to the other, in order to change over the photoelectric cell 47 from one sensitivity range to another sensitivity range through a transmission provided by a pair of links 48 and 49 pivotally connected to the pin 38.

The rear end of the lever 34 has a laterally extending pin 39 secured to it which is engaged in a vertically extending slot 40 in the plate 25. The pin 39 bears downwardly on one arm of a bellcrank lever 41 having a compensating cam 43 fixed to its upper end and engaging a pin 44 fixed to the pointer 45. Thus, vertical up and down adjustment of the pin 30 is transmitted through the lever 41 and cam 43 to change the angular position of the follow-up pointer 45 so that it may be alined with the pointer 46a of the exposure value meter 46. The pin 39 assumes a position dependent on the exposure value set on the camera since the pin 38 is rotatable in a fixed position while the forward pins 37 and 36 are adjustable and the motion of the levers 34 and 35 are dependent upon one another through the coupling member 29.

The exposure value adjusting and setting mechanism of Figs. 6 and 7 operates such that both shafts 12 and 14 and gear wheels 15 and 16 carry out equal angular movements without relative displacement when the exposure value quotient is maintained, and thus both racks 17 and 18 are displaced by the same amount in the same direction. The result of this is that a straight parallelogrammic movement of the levers 34 and 35 takes place, so that with the pin 38 stationary, the pin 39 is merely rotated in the slot 40, whereby the position of the follow-up pointer 45 is unaffected. However, if the shafts 12 and 14 are not equally rotated or are turned in opposite directions, the pin 39 changes its position in the slot 40 and so causes an adjustment of the position of the follow-up pointer 45 through the lever 41 and the cam 43. Briefly the operation is that the sensitivity range of the photocell 47 and the exposure value meter 46 are determined by placement of the pin 39 in one or the other of the openings 50, and one or the other of the finger knobs 10 and 11 are adjusted until the follow-up pointer 45 is alined with the meter pointer 46a. If desired, a particular shutter speed or a particular diaphragm aperture may be set, or else the exposure value adjustment may be made without regard as to the absolute settings.

In accordance with the present invention as illustrated in Figs. 1 to 5, the lever differential mechanism is modified together with its connection to the photoelectric cell and to the follow-up pointer so that there is an automatic change-over from one sensitivity range of the photoelectric cell to the other range and from one measuring range of the exposure value meter to the other range as the exposure value is continuously adjusted. In Fig. 1, the forks 73 and 74 are identical to the forks 23 and 24 previously described. The forks 73 and 74 are connected to concentric shafts identical to the shafts 12 and 14 and to speed adjusting and diaphragm aperture adjusting members identical to the rings 1 and 2 which are manually adjusted by finger knobs identical to the knobs 10 and 11. That is, all of the structure between the knobs 10 and 11 and the forks 23 and 24 in Fig. 6 is provided in the present invention and is identical thereto. The present construction furthermore includes a photoelectric cell identical to the photoelectric cell 47 and an exposure value meter and pointer therefor identical to the exposure value meter 46 and the pointer 46a. The photocell 47 is substantially the same as disclosed in the copending applications of H. Bretthauer, J. Mädge, and M. Kroeger, Serial No. 657,552, filed on May 7, 1957, (now Patent 2,926,562, granted March 1, 1960) and K. Rander et al., Serial No. 641,727, filed Feb. 21, 1957.

A pair of levers 81 and 82 are provided, and each lever is pivoted to one of the forks 73 and 74. Thus, the upper lever 81 has a laterally extending pin 71 at its forward end slidably and pivotally engaged in the slot provided by the fork 73, and in similar fashion the lower lever 82 has a laterally extending pin 72 at its forward end pivotally and slidably engaged in the slot provided by the fork 74. The levers 81 and 82 are coupled at their rear ends by a slide 67 slidably mounted for vertical up and down movement by means of pins 64 and 65 engaging in a vertically extending slot 66 in a base plate 63. The lever 81 has at its rear end a laterally extending pin 68 slidably and pivotally engaged in a slot 70 in the slide 67 extending parallel to the optical axis of the camera, that is, also parallel to the slot in forks 73 and 74. In similar fashion, the lever 82 has at its rear end a laterally extending pin 69 slidably engaged in the rear portion of the slot 70.

The lever system is connected to the follow-up pointer of the exposure meter and to the range-changing mask or shutter of the photocell, as follows: On the base plate 63 there are bent-out ears or lugs 75 and 76 forming horizontal flanges, in which alined vertical holes are drilled to form guides for the rods 77 and 78 vertically movable through these guides holes. The rods 77 and 78 are pivoted by the laterally extending pivot studs 79 and 80, respectively, to the levers 81 and 82, respectively. Through any suitable connection (not shown) the rod 77 is operatively connected to the follow-up pointer of the exposure meter, so that vertical movements of the rod 77 cause the follow-up pointer to swing on its pivot. For example, through any suitable form of mechanical linkage, the movements of the rod 77 will move the control pin 44 (Figs. 6 and 7) of the follow-up pointer 45, either by direct pressure thereon, or through an intermediate operating lever 41, 43. Through any suitable connection (not shown) the rod 78 is operatively connected the the movable mask or shutter which serves to convert the photocell from one sensitivity range to another. For example, the upper end of the rod 78 may be pivoted to the range-changing lever 48 of the above-mentioned companion patent application (Fig. 6 of the present application and Fig. 1 of the companion application), the link 49 of the companion application being entirely omitted.

To provide an automatic change-over between the two sensitivity ranges of the photoelectric cell and the two measuring ranges of the exposure value meter, a parallelogram linkage is provided including a pair of opposing angled links 85 and 86 which are pivoted at their front ends to the base plate 63 by means of the respective pilot pins 83 and 84 spaced vertically from one another in suitable alined positions. The free or rear ends of the links 85 and 86 are coupled with each other by being pivoted at vertically spaced points to a bridge member 89, by pivots 87 and 88, respectively, which pivots are extended to engage in arcuate guide slots 90 and 91 in the base plate 63, which slots limit the extent of swinging movement of the levers 85 and 86.

The arrangement is such that the bridge member 89 is biased toward one or the other of its upper and lower limiting positions. Movement of the links 85 and 86 from one limiting position to the other is instantaneous and is coupled with the change-over of the photoelectric cell from one sensitivity range to another and the change-over of the exposure meter follow-up pointer from one measuring range to another. To facilitate this, the bridge member 89 is provided with a forwardly extending central arm 92 which carries a laterally extending pin 93. A compression spring 94 presses at one end against the bridge arm 92 and at the other end against a stirrup member 95 pivotally mounted on the stud 80. Conveniently, the spring 94 is wound around a U-shaped rod support secured at its upper end to the pin 93 and slidable in any suitable manner into and out of the stirrup 95. In the upper limiting position of the bridge member 89 as illustrated in Fig. 1, the compression spring 94 urges the stud 80 into its lower limiting position abutting a stop provided by a laterally extending lug 76 bent outwardly from the base plate 63. The stud 80 is movable between this lower limiting position and an upper limiting position provided by abutment with a laterally extending stop provided by a lug 75 bent outwardly from the base plate 63 and lying in the path of the stud 80.

To provide for the instantaneous and simultaneous movement of the stud 80 and the parallelogram linkage including the links 85 and 86 and the bridge member 89 between their limiting positions, a downwardly facing lug 97 is provided on the link 86 lying in the path of the stud 79, and an upwardly facing lug 96 is provided on the lower link 85 also lying in the path of movement of the stud 79. To accomplish the instantaneous change-over from one range to the other, it is to be noted that the stud 79 is fixed to the link 81 and has a vertical position dependent on the movement of the fork 73 and also on the position of the rear pin 68. In adjusting the exposure value and the forks 73 and 74, the lower link 82 pivots about the stud 80 as a fixed fulcrum, and the rear end of the link and slide 67 assume a vertical position depending upon the position of the fork 74. The rear end of the link 81 thus moves upwardly and downwardly accordingly and, together with the adjusted position of the fork 73, determines the position of the stud 79. Conveniently, the rod 77 secured to the stud 79 is guided for vertical movement by means of extending through apertures in the fixed stop lugs 75 and 76. Similarly, the stud 80 and the rod 78 connected to it are guided for vertical movement by extending through other alined apertures in the stop lugs 75 and 76. The change-over from one measuring range to another occurs when, in this adjusting movement, the stud 79 abuts the stop lug 96 on the link 85. In the position of Fig. 1, it is noted that this stop 96 is located above the fixed stop 76. Further movement of the stud 79 downwardly abutting the lug 96 pivots the lower link 85 downwardly about the pin 83, carrying with it the bridge 89 and the upper link 86, the bridge 89 sliding downwardly in the slots 90 and 91. During this downward movement of the bridge 89, the spring 94 is further compressed until a horizontal position is reached. Thereafter, the spring 94 is under compression and it acts to urge the bridge member 89 downward to its lower limiting position with the pin 87 abutting the lower end of the slot 91 and simultaneously urges the stud 80 and the rod 78 to its upper limiting position abutting the upper fixed stop 75. This movement will be clarified by the summary following.

Briefly reviewing the operation, the position of the parts illustrated in Fig. 1 corresponds to the start of one of the measuring ranges. In the adjustment of the exposure value, the forks 73 and 74 move upwardly and downwardly in response to the adjustment of the finger knobs and shutter speed and diaphragm aperture adjusting rings operatively connected to the forks 73 and 74 in the manner shown in Fig. 6, although not illustrated in Fig. 1. In the case that the forks 73 and 74 are moved in the same direction and moved the same distance, the slide 67 is displaced in the slot 66, however the studs 79 and 80 maintain their position so that neither the rod 77 nor the rod 78 is actuated. The rod 77, it is to be recalled, is coupled with a follow-up pointer similar to the follow-up pointer 45 shown in Fig. 6, while the rod 78 is coupled to the change-over linkage for the photoelectric cell similar to the linkage shown in Fig. 6. In the case that there is a non-uniform movement of the two forks 73 and 74 or if only one of these forks is moved, which corresponds to a change in the exposure value, the stud 79 is moved downwardly and so is also the rod 77 of the follow-up pointer.

Figure 2:
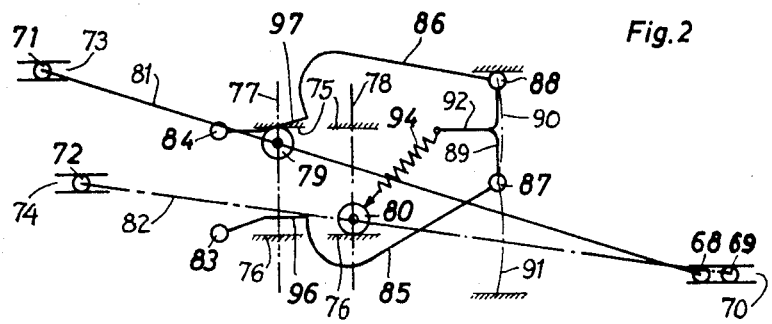
Fig. 2 is a simplified schematic diagram of the mechanism of Fig. 1 shown in the same position as Fig. 1, at the start of one measuring range.
Figure 3:
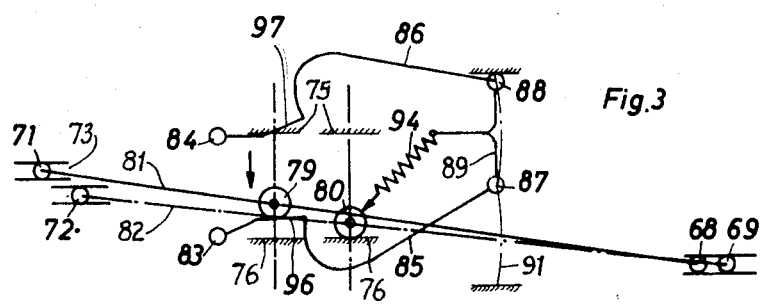
Fig. 3 is a schematic diagram similar to Fig. 2 showing the system just before changing over measuring ranges.

The position of the linkage as in Fig. 1 is shown in diagrammatic form in Fig. 2. In Fig. 2 and also in Figs. 3, 4, and 5, the same numerals are used as in Fig. 1 and it is thought that the diagrams are sufficiently clear so that no further description need be made of them. When in the adjusting movement the stud 79 on the lever 81 comes into abutment with the lug 96 on the link 85, it drives this link and also the bridge member 89 and the upper link 86 comprising the parallelogrammic linkage system in a downward direction. At the instant when the pin 93 on the bridge member 89 has reached a position just below a horizontal line through the center of the stud 80, the force of the compression spring 94 begins to act on the stud 80 with an upward component, and thus presses the stud 80 in an upward direction, from the position of Fig. 3, until it abuts against the fixed lug 75 on the base plate as shown in Fig. 4. At the same time, the parallelogrammic linkage system is forced into its lower limiting position in which the stud 87 abuts the lower end of the slot 91. As the stud 80 moves upwardly, it carries with it a lower lever 82 and moves the slide 67 upwardly in the slot 66. The upward movement of this slide carries the rear end of the lever 81 up with it, positioning the stud 79 just in contact with the lug 97 in its newer lower position.

In this second measurement range, the stud 79 is free to move between the lower fixed stop lug 76 and the lug 97 on the upper link 86. When in the adjustment of the exposure value, the stud 79 moves from the position of Fig. 5 upwardly to and slightly above the position of Fig. 4 abutting the upper stop lug 97, the change-over occurs again, in reverse direction. This time the upper link 86 is urged upwardly, and when the pin 93 is just above a position horizontal with the stud 80, the dead-center of the compression spring 94 is passed and the spring acts with a snap action to complete the movement of the bridge member 89 toward the upper limiting position with the pin 88 abutting the upper end of the slot 90. Simultaneously, the stud 80 is urged downwardly to its lower position abutting the lower stop lug 76 as the stud 80 moves, the rod 78 is given a corresponding movement to change over the photoelectric cell from one sensitivity range to the other.

The automatic change-over of measuring ranges preferably takes place before the extreme end of one measuring range is reached so that there is an overlapping with the other measurement range.

As is readily apparent, one of the advantages of the present invention is that the manual change-over in the Fig. 6 arrangement by deflecting the wedge piece 51 is avoided, and the adjustment of the exposure value over a relatively wide range is possible with continuous manipulation of the finger knobs. Another advantage is that the lever differential mechanism is relatively flat so that it may be contained at the side of the camera without interfering with other parts already occupying more central positions in the camera housing.

As mentioned above, Figs. 6 and 7 of the drawings of this application are approximately duplicates of Figs. 1 and 4, respectively, of what may be called the companion patent application of Hermann Bretthauer (one of the present joint applicants), Serial No. 791,355, filed February 5, 1959.

It is believed that the information herein given is sufficient for an understanding of so much of the companion application as may be necessary in order to understand the present invention. However, the entire disclosure of said companion application is hereby incorporated herein by reference, in case it may be found advisable, during the prosecution of the present application, to amend it to include other portions of the disclosure of the companion application.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera including a built-in photoelectrically operated exposure value meter having at least two measuring ranges and having a pointer, said camera having a picture-taking lens axis, a shutter speed and a diaphragm aperture adjusting member each mounted for rotary movement about said lens axis, means for manually adjusting said members, a pair of axially extending concentric shafts each coupled to one of said rings, a follow-up pointer arranged to be moved into alinement with said meter pointer, lever differential means having one position for one of the measuring ranges and another position for the other measuring range, connecting means between said lever differential means and said follow-up pointer for positioning said follow-up pointer in dependence on the position of said lever differential means, drive means for operatively connecting said concentric shafts and lever differential means and arranged so that said follow-up pointer indicates a constant exposure value when said drive means are moved in the same direction an equal distance and indicates a changed exposure value when said drive means are moved relative to each other, and linkage means lying in the path of movement of said lever differential means at the end of a measurement range for automatically shifting said lever differential means from said one position for one measuring range to said other position for the other measuring range, said linkage means also lying in the path of movement of said connecting means at the end of a measuring range so that said follow-up pointer is simultaneously shifted.

2. A construction as defined in claim 1, wherein said linkage means includes two links, means for fixedly pivoting one of the ends of said two links, a bridge member pivotally interconnecting the other ends of said two links, and lugs on each of said two links alternately lying in the path of movement of said connecting means at its limiting positions.

3. A construction as defined in claim 2, including spring means acting on said bridge member for causing said automatic shifting instantaneously from said one position for one measuring range to said other position for the other measuring range.

4. A construction as defined in claim 3, wherein said spring means also acts on said lever differential means and simultaneously on said connecting means.

5. In a photographic camera of the type including a photoelectric cell having a mask shiftable to two positions corresponding respectively to two sensitivity ranges, an exposure meter follow-up pointer mounted for movement, a shutter speed adjusting member, and a diaphragm aperture adjusting member, the combination of a mask shifting member and a pointer shifting member each movable through a predetermined range of travel, means operated jointly by said speed adjusting member and said aperture adjusting member for shifting the position of said pointer shifting member, and means operated by movement of said pointer shifting member toward one end of its range of travel for shifting said mask shifting member from one of its positions to another of its positions.

6. In a photographic camera of the type including a photoelectric cell having a mask shiftable to two positions corresponding respectively to two sensitivity ranges, an exposure meter follow-up pointer mounted for movement, a shutter speed adjusting member, and a diaphragm aperture adjusting member, the combination of a mask shifting member and a pointer shifting member each movable through a predetermined range of travel, means operated jointly by said speed adjusting member and said aperture adjusting member for shifting the position of said pointer shifting member, and means including a snap-action compression spring shifted by movement of said pointer shifting member toward one end of its range of travel for shifting said mask shifting member from one of its positions to another of its positions.

References Cited in the file of this patent
UNITED STATES PATENTS

| | | |
|---|---|---|
| 2,080,055 | Martin | May 11, 1937 |
| 2,373,391 | Green | Apr. 10, 1945 |
| 2,467,946 | Rossmann | Apr. 19, 1949 |
| 2,576,813 | Simons | Nov. 27, 1951 |
| 2,879,702 | Gossen | Mar. 31, 1959 |
| 2,887,026 | Rentschler | May 19, 1959 |

UNITED STATES PATENT OFFICE
CERTIFICATE OF CORRECTION

Patent No. 2,938,440                      May 31, 1960

Hermann Bretthauer et al.

It is hereby certified that error appears in the above numbered patent requiring correction and that the said Letters Patent should read as corrected below.

In the grant, lines 3 and 4, and 14 and 15, and in the heading to the printed specification, lines 6 and 7, name of assignee, for "Franke & Heidecke Fabrik Photographischer Prazisions-Apparate" read -- Franke & Heidecke, Fabrik Photographischer Prazisions-Apparate --.

Signed and sealed this 1st day of November 1960.

(SEAL)
Attest:

KARL H. AXLINE
Attesting Officer

ROBERT C. WATSON
Commissioner of Patents